(12) United States Patent
Katsuda et al.

(10) Patent No.: US 7,510,210 B2
(45) Date of Patent: Mar. 31, 2009

(54) AIR BAG MODULE

(75) Inventors: Nobuyuki Katsuda, Tatsuno (JP); Mikio Yabuta, Tatsuno (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 11/499,695

(22) Filed: Aug. 7, 2006

(65) Prior Publication Data

US 2007/0029769 A1 Feb. 8, 2007

Related U.S. Application Data

(60) Provisional application No. 60/708,388, filed on Aug. 16, 2005.

(30) Foreign Application Priority Data

Aug. 8, 2005 (JP) .............................. 2005-229402

(51) Int. Cl.
B60R 21/26 (2006.01)
(52) U.S. Cl. .................. 280/736; 280/741; 280/742
(58) Field of Classification Search ................ 280/731, 280/732, 736, 737, 740, 741, 742
See application file for complete search history.

(56) References Cited

U.S. PATENT DOCUMENTS

| | | | | |
|---|---|---|---|---|
| 4,902,036 A | * | 2/1990 | Zander et al. | 280/736 |
| 5,060,973 A | * | 10/1991 | Giovanetti | 280/736 |
| 5,505,488 A | * | 4/1996 | Allard | 280/740 |
| 5,577,768 A | * | 11/1996 | Taguchi et al. | 280/735 |
| 5,806,883 A | * | 9/1998 | Cuevas | 280/731 |
| 5,836,608 A | * | 11/1998 | Soderquist et al. | 280/728.2 |
| 5,842,716 A | * | 12/1998 | Breed | 280/734 |
| 5,860,672 A | * | 1/1999 | Petersen | 280/728.2 |
| 6,186,541 B1 | * | 2/2001 | Ruge et al. | 280/736 |
| 6,189,924 B1 | * | 2/2001 | Hock | 280/736 |
| 6,257,617 B1 | * | 7/2001 | McFarland et al. | 280/736 |
| 6,302,432 B1 | * | 10/2001 | Magoteaux et al. | 280/728.2 |
| 6,419,265 B1 | * | 7/2002 | Breed | 280/735 |
| 6,474,684 B1 | * | 11/2002 | Ludwig et al. | 280/741 |
| 6,513,834 B1 | * | 2/2003 | Blomquist | 280/741 |
| 6,581,963 B2 | * | 6/2003 | Mangum | 280/741 |
| 6,598,901 B2 | * | 7/2003 | Nakashima et al. | 280/736 |
| 6,648,370 B2 | * | 11/2003 | Koga et al. | 280/736 |
| 6,669,230 B1 | * | 12/2003 | Nakashima et al. | 280/735 |
| 6,722,694 B1 | * | 4/2004 | Nakashima et al. | 280/736 |
| 7,150,227 B2 | * | 12/2006 | Matsuda | 102/202 |

(Continued)

FOREIGN PATENT DOCUMENTS

JP 5-168905 A 7/1993

(Continued)

*Primary Examiner*—Toan C To
(74) *Attorney, Agent, or Firm*—Birch, Stewart, Kolasch & Birch, LLP

(57) ABSTRACT

The present invention provides an air bag module comprising;
  a module case accommodating a gas generator and an airbag,
  the gas generator having a housing, which is a assembly of a first base plate and a second base plate provided with a plurality of gas discharge ports, and at least one combustion chamber accommodated inside the housing,
  the module case being attached to a connection section of the first base plate and the second base plate at an opening portion of the module case.

12 Claims, 1 Drawing Sheet

U.S. PATENT DOCUMENTS

2002/0153714 A1  10/2002  Kreuzer
2004/0232680 A1  11/2004  Goetz

FOREIGN PATENT DOCUMENTS

| JP | 10-95303 A | 4/1998 |
| JP | 2001-97175 A | 4/2001 |
| JP | 2001-225711 A | 8/2001 |

* cited by examiner

AIR BAG MODULE

This nonprovisional application claims priority under 35 U.S.C. §119(a) on Patent Application No. 2005-229402 filed in Japan on 8 Aug. 2005 and 35 U.S.C. §119(e) on U.S. Provisional Application No. 60/708,388 filed on 16 Aug. 2005, which are incorporated by reference.

BACKGROUND OF THE INVENTION

1. Field of the Invention

The present invention relates to an air bag module to be used in an air bag system of an automobile.

2. Description of Related Arts

In air bag modules used in air bag systems of automobiles, an air bag and a gas generator are accommodated inside a module case made of a plastic. The air bag module is most often installed in the central portion of a steering wheel for a driver side or in a dashboard for a passenger side. The air bag and gas generator are attached to a metallic base plate integrated with the module case.

From the standpoint of reducing the weight of an automobile and reducing fuel consumption, the air bag system also has to be reduced in weight, and this weight reduction has to be attained, while maintaining the performance of the air bag system.

Other related arts are described in US-A No. 2004-232680, US-A No. 2002-153714 and JP-A No. 5-168905.

SUMMARY OF THE INVENTION

The present invention relates to an air bag module including;

a module case accommodating a gas generator and an airbag, the gas generator having a housing, which is a assembly of a first base plate and a second base plate provided with a plurality of gas discharge ports, and at least one combustion chamber accommodated inside the housing, the module case being attached to a connection section of the first base plate and the second base plate at an opening portion of the module case.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
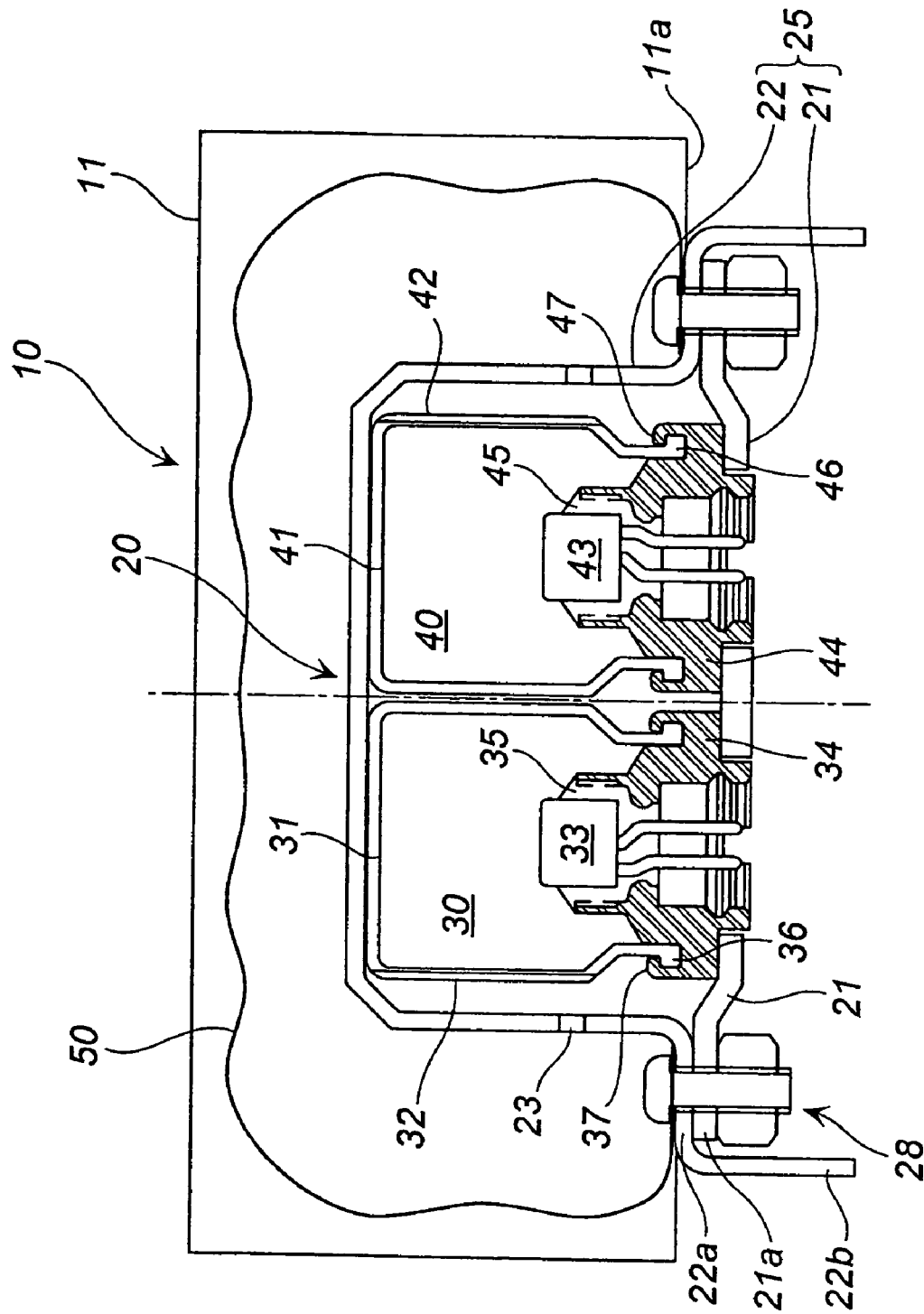
FIG. 1 shows a longitudinal sectional view of an air bag module.

The present invention relates to an air bag system that can be as a whole reduced in weight and whose assembly process can be simplified by simplifying the structure.

In accordance with the present invention, because the housing is formed by an assembly of two base plates, the housing of the gas generator itself can be made unnecessary. As a result, the weight can be accordingly reduced.

Furthermore, the assembling process can be simplified by fixing the module case to the connection section of the first base plate and second base plate. The air bag may be fixed together with the module case to the connection section of the first base plate and second base plate, or may be fixed to any of the module case, first base plate, and second base plate.

In the present invention, one, two or more combustion chambers may be provided. At least one combustion chamber can have a structure described in JP-A Nos. 10-95303, 2001-97175, and 2001-225711. A configuration with two combustion chambers is preferred because the manufacturing process can be further simplified by manufacturing a combustion chamber unit having two cup-shaped containers, a gas generating agent, two igniters, and two igniter collars integrally formed therein (for example, one combustion unit can be obtained as a whole by joining two cup-shaped containers in a portion thereof or by joining two igniter collars in a portion thereof) and attaching the above combustion chamber unit in the production line of the air bag module.

The present invention also relates to the air bag module, wherein the combustion chamber has an ignition device and a gas generating agent accommodated inside a cup-shaped container having a fragile section, and the fragile section of the cup-shaped container is ruptured by actuation of the ignition device to form a gas discharge path.

The fragile section may be a splittable section.

Because the housing is formed by an assembly of the first base plate and the second base plate having gas discharge ports, from the standpoint of maintaining the inside of the combustion chamber in a moisture-proof state, it is preferred that no opening portion be present in the cup-shaped container. Accordingly, opening portions were eliminated and a gas discharge path was ensured by providing a fragile section in the cup-shaped container.

The fragile section can be formed by reducing the thickness in part of the cup-shaped container or by forming a notch or groove, and the discharge direction of gas can be controlled by adjusting the formation position of the fragile section. In order to increase combustion efficiency and reduce the size of the gas generator, it is preferred that the fragile section be provided in the peripheral surface of the cup-shaped container to eject the combustion products or flame in the radial direction.

The present invention also relates to the air bag module wherein the ignition device is fixed to the first base plate.

The ignition device may include an electric igniter or, if necessary, a combination of an electric igniter and a transfer charge. The electric igniter may be attached by being fixed to the first base plate after being fixed to a metallic igniter collar, or the electric igniter may be fixed directly to the first base plate.

The entire structure of the air bag module in accordance with the present invention is simplified. Therefore, the entire air bag module can be reduced in weight. Moreover, because the assembling process can be simplified, the assembly time of the entire air bag system can be shortened.

Embodiments of the Invention

The explanation will be provided below with reference to FIG. 1. FIG. 1 is an longitudinal sectional view of an air bag module.

An air bag module 10 includes a gas generator 20, an air bag 50 and a module case 11 accommodating the gas generator and the air bag therein. The module case 11 and gas generator 20 have a round planar shape in the sectional view.

The gas generator 20 has a housing 25, which is an assembly of a first base plate 21 of a round planar shape and a second base plate 22 of a round planar shape, and a first combustion chamber 30 and a second combustion chamber 40 accommodated inside the housing 25.

A plurality of gas discharge ports 23 are provided on the peripheral surface of the second base plate 22, and the second base plate 22 has a function of a diffuser shell in conventional gas generators. A plurality of the gas discharge ports 23 are formed and a seal tape for moisture proofing is not pasted thereon.

Because the housing is thus formed by an assembly of two base plates, the housing of the gas generator itself becomes unnecessary.

In the first combustion chamber 30, a first igniter 33 and a well-known gas generating agent (not shown in the drawing) are accommodated inside a cup-shaped container 31. The cup-shaped container 31 serves to be filled with the prescribed quantity of gas generating agent and to block out moisture.

The cup-shaped container 31 is made of aluminum or the like, and a fragile section 32 is provided, so as to be easily ruptured, in part of the peripheral surface thereof. The fragile section 32 is a V-shaped groove provided inwardly from the outside in the peripheral surface of the cup-shaped container 31.

The first igniter 33 is supported inside a first igniter collar 34 made from a metal via a resin 35. The first igniter collar 34 is fixed by fitting into a hole provided in the first base plate 21.

The opening portion of the cup-shaped container 31 is fixed by fitting a short flange section 36 into an annular groove provided in the peripheral surface of the first igniter collar 34 and crimping an outer wall 37 of the annular groove. Thus, because the inside of the cup-shaped container 31 does not communicate with the outside, moisture does not penetrate from the outside.

In the second combustion chamber 40, a second igniter 43 and a well-known gas generating agent (not shown in the drawing) are accommodated inside a cup-shaped container 41. The cup-shaped container 41 is filled with the prescribed quantity of the gas generating agent and blocks out moisture. The cup-shaped container 41 also serves to prevent the gas generating agent located inside the second combustion chamber 40 from being ignited by a high-temperature gas ejected from the first combustion chamber 30 in the case where the first igniter 33 is initially actuated and then the second igniter 43 is a actuated with a delay.

The cup-shaped container 41 is made of aluminum or the like, and a fragile section 42 is provided, so as to be easily ruptured, in part of the peripheral surface thereof. The fragile section 42 is a V-shaped groove provided inwardly from the outside in the peripheral surface of the cup-shaped container 41.

The peripheral surfaces of the cup-shaped container 41 and cup-shaped container 31 are not in contact with each other, and even the peripheral surfaces that are closest to each other are separated by a gap. The fragile section 42 of the second combustion chamber 40 and the fragile section 32 of the first combustion chamber 30 are formed in the opposite peripheral surfaces of the second base plate 22.

The second igniter 43 is supported inside a second igniter collar 44 made from a metal via a resin 45. The second igniter collar 44 is fixed by fitting into a hole provided in the first base plate 21. Thus, because the inside of the cup-shaped container 41 does not communicate with the outside, moisture does not penetrate from the outside. The second igniter collar 44 and first igniter collar 34 can be joined by parts of the close peripheral surfaces thereof to form a single initiator collar.

The opening portion of the cup-shaped container 41 is fixed by fitting a short flange section 46 into an annular groove provided in the peripheral surface of The second igniter collar 44 and crimping an outer wall 47 of the annular groove.

The first base plate 21 and the second base plate 22 are fixed by aligning a plurality of holes formed in the peripheral edge section 21a of the first base plate 21 and a plurality of holes formed in the flange section 22a of the second base plate 22 and using fixing member 28 having a set of a bolt and a nut.

The air bag 50 covers the second base plate 22 from the gas inlet port, and the module case 11 covers the air bag 50 from the round opening portion provided in the bottom surface 11a.

The air bag 50 and module case 11 are fixed together with the first base plate 21 and second base plate 22 with the fixing member 28 in the connection section of the first base plate 21 and second base plate 22. Because the first base plate 21, second base plate 22, air bag 50, and module case 11 can thus fixed by the common fixing member 28, the assembling process is simplified.

The air bag module 10 is mounted on a vehicle at a round skirt section 22b of the second base plate 22. A notch or the like is provided on the surface of the module case 11 in the direction in which the air bag 50 deploys so as to facilitate the rupture when the air bag 50 is deployed.

The operation of the air bag module 10 will be explained below. The case where the first igniter 33 is initially actuated and then the second igniter 43 is actuated with a slight delay will be explained below.

When an automobile collides and an impact is received, an actuation signal is received from a control unit (not shown) and the first igniter 33 is actuated and ignited, thereby causing ignition and combustion of the gas generating agent located inside the first combustion chamber 30. When the internal pressure rises due gas generation, the fragile section 32 is ruptured and gas is released from the cup-shaped container 31. The released gas is discharged from the gas discharge ports 23 and inflates the air bag 50.

Then, the second igniter 43 is actuated and ignited with a slight delay, thereby causing ignition and combustion of the gas generating agent located inside the second combustion chamber 40. When the internal pressure rises due to combustion gas generation, the fragile section 42 is ruptured and gas is released from the cup-shaped container 41. The released gas is discharged from the gas discharge ports 23 and further inflates the air bag 50.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An air bag module, comprising:
an ignition device;
an igniter collar that supports the ignition device;
a first base plate adapted to support the ignition device;
a second base plate provided with a gas discharge port, the first base plate and the second base plate being adapted to define a combustion chamber when the first base plate and the second base plate are attached to one another;
a cup-shaped container including an open end and fixed to the first base plate by attaching the open end to the igniter collar, the cup-shaped container being provided within the combustion chamber and accommodating a gas generating agent therein;
a module case adapted to cover the first base plate and the second base plate; and a fixing member for fastening the first base plate, the second base plate, and the module case by penetrating through the first base plate, the second base plate, and the module case, wherein, the cup-shaped container, the first base plate, and the second base plate define a space in which no gas generating agent is provided.

2. The air bag module according to claim 1, wherein the ignition device is accommodated inside the cup-shaped container, and wherein the cup-shaped container has a fragile section that is ruptured by actuation of the ignition device to form a gas discharge path.

3. The air bag module according to claim 1, wherein the fixing member is a bolt and a nut.

4. The air bag module according to claim 1, further comprising:

an air bag accommodated inside the module case, wherein the fixing member also penetrates through an inlet portion of the air bag, such that the air bag is secured to the first base plate, the second base plate, and the module case.

5. An air bag module, comprising:

a first base plate including a first hole formed in a peripheral edge thereof and defining a first igniter accommodating hole;

a second base plate including a gas discharge port formed in a peripheral surface thereof, the second base plate defining a second hole, the first base plate and the second base plate defining therein an accommodating space;

a first igniter provided in a first igniter collar and attached to the first igniter accommodating hole;

a first container defining therein a first combustion chamber and including a first gas generating agent, such that the first container blocks out moisture from the first combustion chamber, the first container being a cup-shaped container including a first open end and fixed to the first base plate by attaching the first open end to the first igniter collar, the first container being provided within the accommodating space;

a fixing member inserted in the first hole and the second hole for fixing the first base plate to the second base plate, the first base plate and the second base plate being fixed to one another only by the fixing member; and a module case accommodating therein an air bag and connected to the second base plate, wherein the accommodating space defined outside the first container contains no gas generating agent including the first gas generating agent.

6. An air bag module according to claim 5, wherein the first base plate includes a second igniter accommodating hole, and the air bag module, further comprising:

a second igniter provided in a second igniter collar and attached to the second igniter accommodating hole; and a second container defining therein a second combustion chamber and including a second gas generating agent such that the second container blocks out moisture, the second container being a cup-shaped container including a second open end and fixed to the first base plate by attaching the second open end to the second igniter collar, the second container being provided within the accommodating space.

7. An air bag module according to claim 6, wherein the first container and the second container includes a fragile section ruptured by an actuation of the first igniter and the second igniter, respectively, and form a gas discharge path.

8. An air bag module according to claim 6, wherein the second igniter collar is made of metal.

9. An air bag module according to claim 6, further comprising:

a gas generator having the first base plate, the first igniter, the second igniter, the first container, and the second container, wherein the module case includes the air bag and the second base plate.

10. An air bag module according to claim 5, wherein the first igniter collar is made of metal.

11. An air bag module according to claim 5, wherein the fixing member is a bolt and a nut.

12. An air bag module according to claim 5, further comprising:

a gas generator having the first base plate, the first igniter, and the first container, wherein the module case includes the air bag and the second base plate.

* * * * *